United States Patent
Ickman et al.

(10) Patent No.: US 10,387,123 B2
(45) Date of Patent: *Aug. 20, 2019

(54) LIGHTWEIGHT FRAMEWORK FOR WEB APPLICATIONS

(71) Applicant: Microsoft Technology Licensing, LLC, Redmond, WA (US)

(72) Inventors: Steven Ickman, Snoqualmie, WA (US); David Raskino, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,392

(22) Filed: Feb. 3, 2014

(65) Prior Publication Data
US 2014/0149965 A1 May 29, 2014

Related U.S. Application Data

(63) Continuation of application No. 13/323,198, filed on Dec. 12, 2011, now Pat. No. 8,671,417.

(51) Int. Cl.
*G06F 9/54* (2006.01)
*G06F 8/30* (2018.01)
(Continued)

(52) U.S. Cl.
CPC .............. *G06F 8/31* (2013.01); *G06F 8/38* (2013.01); *G06F 9/45512* (2013.01)

(58) Field of Classification Search
None
See application file for complete search history.

(56) References Cited

U.S. PATENT DOCUMENTS 7,523,401 B1   4/2009   Aldridge
7,546,576 B2   6/2009   Egli
(Continued)

FOREIGN PATENT DOCUMENTS

CN   102271121 A   12/2011
JP   2006512694 A   4/2006
(Continued)

OTHER PUBLICATIONS

Terkaly, B., "Using jQuery against RESTful Web Services powered by Windows Azure" (Nov. 17, 2011), pp. 1-6 [retrieved from http://blogs.msdn.com/b/brunoterkaly/archive/2011/11/17/how-to-consume-restful-services-using-jquery-and-or-javascript.aspx].*

(Continued)

*Primary Examiner* — Brian W Wathen
(74) *Attorney, Agent, or Firm* — Medley, Behrens & Lewis, LLC

(57) ABSTRACT

Various technologies described herein pertain to developing a web application using a scripting language-based framework. A call can be received via an interface of the scripting language-based framework. The call can manage a control included in the scripting language-based framework. Further, the call can be provided by an application that references the scripting language based framework. Moreover, a user interface can be generated based on the control managed by the call, and backend cloud-based services provided by a distributed data store on a cloud platform can be accessed based on the control managed by the call.

20 Claims, 6 Drawing Sheets

(51) Int. Cl.
*G06F 8/38* (2018.01)
*G06F 9/455* (2018.01)

(56) References Cited

U.S. PATENT DOCUMENTS

| | | | |
|---|---|---|---|
| 7,739,611 | B2 | 6/2010 | Hirschberg et al. |
| 8,015,543 | B1* | 9/2011 | Carrick ................ G06F 8/35 717/106 |
| 2002/0087858 | A1* | 7/2002 | Oliver .................. G06F 21/32 713/156 |
| 2004/0046789 | A1 | 3/2004 | Inanoria |
| 2005/0278792 | A1 | 12/2005 | Ramani et al. |
| 2007/0006136 | A1 | 1/2007 | Hirschberg et al. |
| 2007/0061488 | A1* | 3/2007 | Alagappan ....... G06F 17/30905 709/246 |
| 2007/0106946 | A1 | 5/2007 | Goetz et al. |
| 2009/0013245 | A1 | 1/2009 | Cudich et al. |
| 2009/0313004 | A1 | 12/2009 | Levi et al. |
| 2010/0100823 | A1 | 4/2010 | Ewe et al. |
| 2011/0191407 | A1 | 8/2011 | Fu et al. |
| 2011/0265164 | A1 | 10/2011 | Lucovsky et al. |
| 2012/0036494 | A1 | 2/2012 | Gurumohan et al. |
| 2012/0131473 | A1 | 5/2012 | Biron, III |
| 2013/0111349 | A1 | 5/2013 | Yan et al. |
| 2013/0152107 | A1 | 6/2013 | Ickman et al. |

FOREIGN PATENT DOCUMENTS

| | | |
|---|---|---|
| JP | 2009086759 A | 4/2009 |
| JP | 2010117793 A | 5/2010 |

OTHER PUBLICATIONS

Sanderson, S.; Freeman, A., "Pro ASP.NET MVC 3 Framework", 3rd Edition (Jun. 27, 2010), APress, pp. 1-824.*
Holzner, S., "jQuery: Visual QuickStart Guide" (2009), pp. 103-137.*
Song, Z.; Molina, J.; Strong, C., "Trusted Anonymous Execution: A Model to Raise Trust in Cloud" (Nov. 1-5, 2010), 9th International Conference on Grid and Cooperative Computing, pp. 133-138 [retrieved from http://ieeexplore.ieee.org/stamp/stamp.jsp?tp=&arnumber=5662513].*
Blower, J.D., "GIS in the cloud: implementing a web map service on Google App Engine" (2010), Proceedings of COM.Geo '10, pp. 1-4 [retrieved fromhttp://dl.acm.org/citation.cfm?id=1823893].*
Microsoft Computer Dictionary, 5$^{th}$ Ed. (2002), pp. 225.*
Wikipedia, "List of Ajax frameworks" (Nov. 26, 2011), pp. 1-4 [retrieved from https://en.wikipedia.org/w/index.php?title=Ajax_(programming)&oldid=464956129].*
Wikipedia, "Ajax (programming)" (Dec. 9, 2011), pp. 1-5 [retrieved from https://en.wikipedia.org/w/index.php?title=Ajax_(programming)&oldid=464956129].*
jQuery.com, "puery.get( )—jQuery API" (Dec. 10, 2011) pp. 1-14 [retrieved from https://web.archive.org/web/20111210043345/http://api.jquery.com/jQuery.get].*
Lucky's Notes, "How System.out.println( ) really works" (May 21, 2010), pp. 1-13 [retrieved from https://luckytoilet.wordpress.com/2010/05/21/how-system-out-println-really-works/].*
Rohler, N., "Detect browser—show different links" (Oct. 24, 2011), pp. 1-3 [retrieved from https://stackoverflow.com/questions/7880241/detect-browser-show-different-links].*
Walsh, D., "Android Detection with JavaScript or PHP" (Mar. 1, 2011), pp. 1-15 [retrieved from https://davidwalsh.name/detect-android].*
Walsh, D., "iPhone & iPod Detection Using JavaScript" (Feb. 19, 2009), pp. 1-17 [retrieved from https://davidwalsh.name/detect-iphone].*
Cray, B., "Redirect iPhone, Blackberry, & Palm Requests With .htaccess" (Jan. 26, 2009), pp. 1-3 [retrieved from https://web.archive.org/web/20090201032732/http://dev-tips.com/featured/redirect-iphone-blackberry-palm-requests-with-htaccess].*
Denning, D., "A lattice model of secure information flow" (May 1976), Communications of the ACM, vol. 19, Issue 5, pp. 236-243 [retrieved from https://dl.acm.org/citation.cfm?id=360056]. (Year: 1976).*
Lamspon, B., "Protection" (Jan. 1974), ACM SIGOPS Operating Systems Review, vol. 8, Issue 1, pp. 18-24 [retrieved from https://dl.acm.org/citation.cfm?id=775268]. (Year: 1974).*
Graham, G.S.; Denning, P.J., "Protection: principles and practice" (May 1972), Proceedings of the AFIPS '72, pp. 417-429 [ retrieved from https://dl.acm.org/citation.cfm?id=1478928]. (Year: 1972).*
Osborn, S.; Sandhu, R.; Munawer, Q., "Configuring Role-Based Access Control to Enforce Mandatory and Discretionary Access Control Policies" (May 2000), ACM Transactions on Information and System Security, vol. 3, Issue 2, pp. 85-106 [retrieved from https://dl.acm.org/citation.cfm?id=354878]. (Year: 2000).*
Ennai, et, al., "MobileSOA: A Service Oriented Web 2.0 Framework for Context-Aware, Lightweight and Flexible Mobile Applications", Retrieved at <<http://ieeexplore.ieee.org/stamp/stamp.jsp?tp=&arnumber=4815039>>, Proceedings of the 12th Enterprise Distributed Object Computing Conference Workshops (EDOCW), Sep. 16, 2008, pp. 345-352.
Alam, et al., "xDAuth: A Scalable and Lightweight Framework for Cross Domain Access Control and Delegation", Retrieved at <<http://profsandhu.com/zhang/pub/sacmat11-xdauth.pdf>>, 16th ACM symposium on Access control models and technologies (SACMAT), Jun. 15-17, 2011, pp. 31-40.
"Building JavaScript Web Apps with MVC & Spine.js", Retrieved at <<http://addyosmani.com/blog/building-apps-spinejs/>>, Retrieved Date: Oct. 19, 2011, pp. 1-26.
"VMware vFabric Cloud Application Platform", Retrieved at <<http://www.vmware.com/products/vfabric/>>, Retrieved Date: Oct. 20, 2011, pp. 1-2.
Sun, Bruce, "A Multi-Tier Architecture for Building RESTful Web Services", Retrieved at <<http://www.ibm.com/developerworks/web/library/wa-aj-multitier/index.html>>, Jun. 9, 2009, pp. 1-5.
"International Search Report", dated Mar. 28, 2013, Application No. PCT/US2012/069318, Filed Date: Dec. 12, 2012, pp. 1-7.
Barron, David, "The World of Scripting Languages," (2000), John Wiley & Sons, Ltd., pp. 1-22.
Rittinghouse, et al., "Cloud Computing Implementation, Management, and Security," (2010), CRC Press, pp. 1-340.
"Supplementary Search Report Received for European Patent Application No. 12856844.1", dated Apr. 20, 3 Pages.
"Office Action Received for European Patent Application No. 12856844.1", dated May 5, 2015, 5 Pages.
Herrington, Jack D., "Build an Easy JavaScript Data Access Layer", Available at: <<http://www.ibm.com/developerworks/library/x-javascriptdataaccess/x-javascriptdataaccess-pdf.pdf>>, Mar. 15, 2011, 14 Pages.
"First Office Action for Chinese Patent Application No. 201280061101.9", dated Feb. 1, 2016, 14 pages.
"Office Action Issued in European Patent Application No. 12856844.1", dated Nov. 27, 2015, 6 Pages.
"Response to the First Office Action for Chinese Patent Application No. 201280061101.9", dated May 31, 2016, 7 pages.
"Response to the Office Action Issued in European Patent Application No. 12856844.1", Filed Date: Dec. 30, 2015, 18 Pages.
"Office Action Issued in European Patent Application No. 12856844.1", dated May 9, 2016, 4 Pages.
"Responseto the Third Office Action Issued in Chinese Patent Application No. 201280061101.9", Filed Date: May 10, 2017, 8 Pages.
"Third Office Action Issued in Chinese Patent Application No. 201280061101.9", dated Feb. 24, 2017, 11 Pages.
"AJAX and Database Operations", Retrieved from<< http://tutorialspoint.com/ajax/ajax_database.htm>>, Publication Date: Mar. 8, 2007, 6 Pages.
"Second Office Action and Search Report Issued in Chinese Patent Application No. 201280061101.9", dated Sep. 6, 2016, 17 Pages.
"Office Action for Chinese Patent Application No. 201280061101.9", dated Aug. 14, 2017, 9 pages.

(56) References Cited

OTHER PUBLICATIONS

"Decision to Grant a Patent for Japanese Patent Application No. 2014-546194", dated Mar. 21, 2017, 3 pages.
"Voluntary Amendment for Chinese Patent Application No. 201280061101.9", Filed Date: Dec. 3, 2014, 17 pages.
"Office Action Issued in Japanese Patent Application No. 2014-546194", dated Nov. 1, 2016, 6 Pages.
"Response to the Second Office Action for Chinese Patent Application No. 201280061101.9", Filed Date: Nov. 15, 2016, 19 pages.
"Decision to Grant a Patent for Japanese Patent Application No. 2014-546194", dated Date: Mar. 21, 2017, 3 pages.
"International Preliminary Report on Patentability for PCT Patent Application No. PCT/US2012/069318", dated Jun. 26, 2014, 5 pages.
"Voluntary Amendment for Chinese Patent Application No. 201280061101.9", dated Dec. 3, 2014, 17 pages.
"Response to the Office Action for European Patent Application No. 12856844.1", Filed Date: May 28, 2015, 6 pages.
"Request for Examination with Voluntary Amendment for Japanese Patent Application No. 2014-546194", Filed Date: Nov. 24, 2015, 9 pages.
"Response to the Office Action for Japanese Patent Application No. 2014-546194", Filed Date: Jan. 31, 2017, 10 pages.
"Notice of Allowance Issued in Korean patent Application No. 10-2014-7015889", dated Mar. 21, 2019, 3 Pages.

\* cited by examiner

LIGHTWEIGHT FRAMEWORK FOR WEB APPLICATIONS

CROSS-REFERENCE TO RELATED APPLICATION

This application is a continuation of U.S. patent application Ser. No. 13/323,198, filed on Dec. 12, 2011, and entitled "LIGHTWEIGHT FRAMEWORK FOR WEB APPLICATIONS", the entirety of which is incorporated herein by reference.

BACKGROUND

A web application is an application that can be accessed over a network such as the Internet. A web application can be coded in a browser-supported language (e.g., scripting language combined with markup language) that can be accessed and used through a client-side web browser or another application on a client device (e.g., mobile application, desktop application, etc.). Web applications have become increasingly popular due to ubiquity of web browsers and convenience of using web browsers as clients. Moreover, the popularity of web applications has led to growth of centralized application marketplaces.

Recently, cloud computing has become more pervasive. Accordingly, web applications can be built on a cloud platform, where the web applications can run in the cloud and/or use backend services provided by the cloud. Conventional development of an application built on a cloud platform commonly involves a web programmer having an understanding of various cloud platform specific information (e.g., protocols, data structures, etc.) in order to read data from the cloud, write data to the cloud, use other backend services, and the like. In addition to such complexity associated with developing an application on a cloud platform, conventional development oftentimes can be time consuming. With the growth of the centralized application marketplaces, web programmers are increasingly looking for ways to write powerful applications in less time that work across mobile devices and web browsers.

SUMMARY

Described herein are various technologies that pertain to developing a web application using a scripting language-based framework. An interface of the scripting language-based framework can be exposed. Moreover, a call can be received via the interface of the scripting language-based framework. The call can manage a control included in the scripting language-based framework. Further, the call can be provided by an application that references the scripting language based framework. Moreover, a user interface can be generated based on the control managed by the call, and backend cloud-based services provided by a distributed data store on a cloud platform can be accessed based on the control managed by the call.

The scripting language-based framework can include a set of controls that are pre-programmed to access the backend cloud-based services and generate user interfaces when enabled. According to an example, an application can be developed that provides calls to enable, disable, set values of properties of, etc. one or more of the controls included in the scripting language-based framework. For instance, the calls can be generated from scripting language code included in the application. Thus, an application can be developed that employs functionality incorporated into the scripting language-based framework (e.g., by managing the set of controls) rather than by including custom code in the application to perform such functionality.

In various embodiments, the backend cloud-based services provided by the distributed data store on the cloud platform can include one or more of writing data to the distributed data store, reading data from the distributed data store, searching for data retained in the distributed data store, indexing data in the distributed data store, and so forth. Additionally or alternatively, one or more third party services can be accessible via the distributed data store on the cloud platform and/or directly from the scripting language-based framework.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
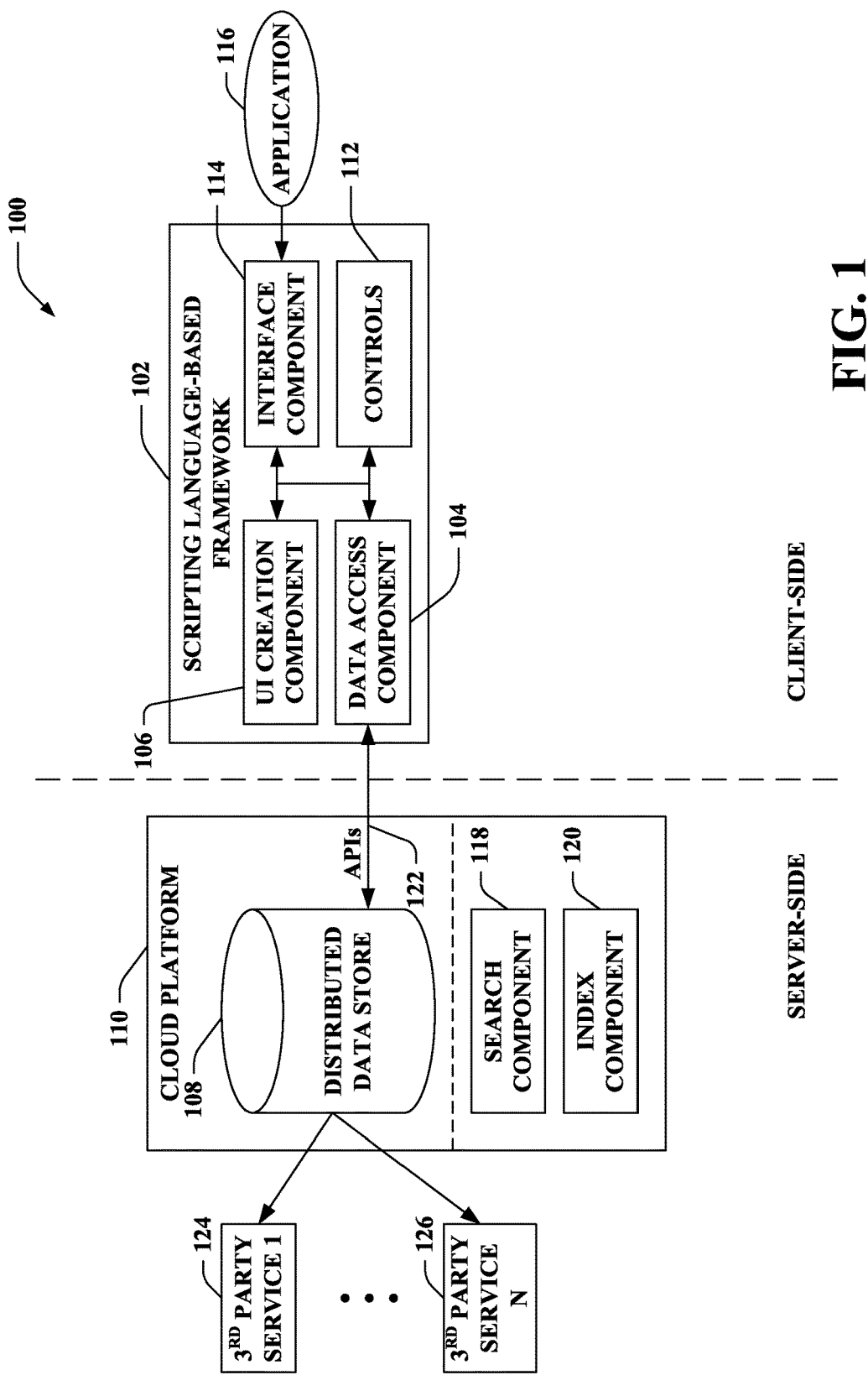
FIG. 1 illustrates a functional block diagram of an exemplary system that facilitates developing web applications.

Various technologies pertaining to developing web applications using a lightweight, client-side framework are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a lightweight framework can facilitate rapid web application development by a web programmer. The lightweight framework described herein can be a scripting language-based framework. Moreover, the lightweight framework can enable device-compatible user interface creation and access to data retained in a distributed data store on a cloud platform and/or backend cloud-based services provided by or available via the distributed data store on the cloud platform. In contrast, conventional frameworks used for web application development oftentimes support user interface creation without supporting data access. Accordingly, in conventional web application development, a web programmer oftentimes needs to have knowledge of cloud technologies, data structures, protocols, and so forth to develop a web application that reads data from the cloud, writes data to the cloud, or employs other backend cloud-based services.

Referring now to the drawings, FIG. 1 illustrates a system 100 that facilitates developing web applications. The system 100 includes a scripting language-based framework 102, which, in an exemplary embodiment, is a client-side framework. For instance, the scripting language-based framework 102 can be a feature-rich, lightweight framework. Moreover, the scripting language-based framework 102 can support development of web applications by mitigating overhead associated with common activities performed during application development. Thus, a web programmer need not perform such common activities during application development since functionality associated with these activities can be incorporated into the scripting language-based framework 102, and instead, the web programmer can create an application that uses the functionality supplied by the scripting language-based framework 102.

Developing a web application typically involves building a set of user interfaces and building data access to a backend system (and/or building the backend system). The user interfaces can collect various forms of input from a user and can process the input to conform to specifications of the backend system. Moreover, the user interfaces can present an output to a user. The scripting language-based framework 102 simplifies development of a web application by allowing a web programmer to manage both data access to the backend system and creation of user interfaces with basic scripting language code and/or markup language code. For example, the scripting language can be JavaScript®. An example of the markup language can be HTML. It is to be appreciated, however, that the claimed subject matter is not limited to the foregoing examples.

The scripting language-based framework 102 includes a data access component 104 and a user interface (UI) creation component 106. The data access component 104 integrates with a cloud-based backend system. In particular, the data access component 104 can access backend cloud-based services provided by a distributed data store 108 on a cloud platform 110. For example, the data access component 104 can read data from the distributed data store 108, write data to the distributed data store 108, employ third party backend cloud-based service(s) abstracted by the distributed data store 108, and so forth. The data access component 104 can be designed to automatically use the distributed data store 108; thus, a web application developed by a web programmer can automatically use the distributed data store 108 without the web programmer needing to integrate access to backend cloud-based services provided by the distributed data store 108.

Moreover, the UI creation component 106 can generate a set of user interfaces. The UI creation component 106 can generate user interfaces that can collect various forms of input from a user and can process the input to conform to specifications of the backend system. Further, the UI creation component 106 can generate user interfaces that can present an output to a user.

Further, the scripting language-based framework 102 includes a set of controls 112. According to an example, the scripting language-based framework 102 can include one or more scripting language libraries that include the controls 112. The controls 112 can be utilized by the UI creation component 106 to create user interfaces and the data access component 104 to access backend cloud-based services provided by the distributed data store 108 on the cloud platform 110. According to an illustration, when a given control from the controls 112 is enabled, the UI creation component 106 can generate a user interface based on the given control and the data access component can access backend cloud-based services provided by the distributed data store 108 on the cloud platform 110 based on the given control. Thus, the given control can be utilized by the web programmer as opposed to the web programmer writing custom code to provide the functionality of the given control.

The scripting language-based framework 102 can further include an interface component 114. The interface component 114 can be a scripting language interface for an application 116 (e.g., a web application), where the application 116 can include scripting language code and/or markup language code. The application 116 can reference the scripting language-based framework 102 via the interface component 114 to employ functionality incorporated into the scripting language-based framework 102. Moreover, the application 116 can provide call(s) to the scripting language-based framework 102 via the interface component 114. For instance, the call(s) can manage one or more of the controls 112 (e.g., a call can manage a control from the controls 112). According to an example, a call can be generated from scripting language code included in the application 116; thus, the application 116 can include scripting language code that can generate one or more calls that manage one or more of the controls 112, where the one or more calls can be provided to the scripting language-based framework 102 via the interface component 114.

The controls 112 in the scripting language-based framework 102 can be enabled or disabled based upon the scripting language code included in the application 116 (e.g., in response to the call(s) provided by the application 116 via the interface component 114). Moreover, the controls 112 can have properties and effects that can be managed by the scripting language code in the application 116 (e.g., in response to the call(s) provided by the application 116 via the interface component 114). According to an example, one or more of the controls 112 can be dynamically stylized based on the scripting language code in the application 116. By way of another example, one or more of the controls 112 can have a range of properties that can be set in response to the scripting language code in the application 116.

The scripting language-based framework 102 can be used by a web programmer when developing the application 116. The scripting language-based framework 102 provides functionality related to data access (e.g., via the data access component 104) and user interface generation (e.g., via the UI creation component 106). Accordingly, use of the scripting language-based framework 102 can reduce an amount of time spent by a web programmer when developing the application 116. Thus, the scripting language-based framework 102 can improve an ability of the web programmer of the application 116 to manage data access and user interface creation using scripting language code and/or markup language code.

The data access component 104 can directly access the distributed data store 108 on the cloud platform 110. Accordingly, the web programmer can generate the application 116 to read from and/or write to the distributed data store 108 using simple scripting language code and/or markup language code. The web programmer can create the application 116 without having knowledge of cloud technologies, data structures, protocols, and the like. Rather, the application 116 can manage (e.g., enable, disable, set a value of a property or effect, stylize, etc.) one or more of the controls 112; based on the one or more of the controls 112 as managed by the application 116, the data access component 104 can directly access the distributed data store 108 on the cloud platform 110.

The distributed data store 108 is built on the cloud platform 110. The distributed data store 108 can be a fully scalable, replicated data store on the cloud platform 110. In an exemplary embodiment, the distributed data store 108 can be a NoSQL store. Further, the distributed data store 108 can be built on a search component 118 and an index component 120. The search component 118 can be a search engine that provides full text and/or image search. The cloud platform 110 can also provide other backend services in addition to or instead of the search component 118 and the index component 120. Thus, according to an example, the data access component 104 can search for data in the distributed data store 108 using the search component 118, index data in the distributed data store 108 using the index component 120, and so forth.

The distributed data store 108 on the cloud platform 110 is exposed through a set of application programming interfaces (APIs) 122. The APIs 122 can be RESTful (representational state transfer) APIs. Moreover, the APIs 122 can be integrated into the scripting language-based framework 102. For example, the data access component 104 can employ the APIs 122 to access the distributed data store 108. Accordingly, the scripting language-based framework 102 can abstract the APIs 122 such that a web programmer need not learn how to utilize the APIs 122. Rather, the interface component 114 can expose a simple scripting language interface that can be employed by the web programmer for developing the application 116. By way of example, the controls 112 available in the scripting language-based framework 102 can be exposed via the interface component 114.

Moreover, a set of third party services can be integrated into the distributed data store 108: namely, a third party service 1 124, . . . , and a third party service N 126, where N can be substantially any integer (collectively referred to herein as third party services 124-126). Accordingly, the distributed data store 108 can provide access to APIs of the third party services 124-126. Hence, the data access component 104 can access the third party services 124-126 (e.g., third party backend cloud-based services) via the distributed data store 108 on the cloud platform 110. Examples of the third party services 124-126 can include a web search service, an image search service, a video search service, a social networking service, a microblogging service, a mapping service, a semi-structured database search service, an authentication service, a cloud platform service, and so forth. It is to be appreciated, however, that the claimed subject matter is not limited to the foregoing examples of the third party services 124-126, and rather, any third party service is intended to fall within the scope of the hereto appended claims.

Further, upon completion of development, the application 116 can be uploaded to a web hosting service (not shown). Since the application 116 can be written in scripting language code and/or markup language code, the application 116 can be embedded or uploaded to substantially any website, for example. Upon being made available, the application 116 can be retrieved and loaded onto a web browser of a client device (not shown) for execution. Further, the application 116 can be client device agnostic such that it can work across modern desktop, laptop, and mobile browsers.

The following illustration demonstrates a conventional approach for developing an application that maintains an address book in a cloud-based data store. A web programmer can initially define data objects and relationships between the data objects (e.g., people, organizations to which people belong, etc.). Thereafter, the web programmer can build a set of user interfaces. According to an example, the web programmer can build a user interface to create a contact, a user interface to associate the contact with other contacts, a user interface to update a contact, a user interface to delete a contact, a user interface to search over contacts, and so forth. Upon developing the user interfaces and defining the data objects, the web programmer can build a set of backend services (e.g., backend cloud-based services) and/or build a system that accesses a set of backend services. Examples of the backend services can include a service to write data to the cloud-based data store, a service to read data from the cloud-based data store, a service to search over the data retained in the cloud-based data store, a service to edit data in the cloud-based data store, a service to delete data from the cloud-based data store, and so forth. The foregoing approach can be time consuming for the web programmer. Moreover, such development can involve significant understanding of various protocols, data structures, and so forth.

In contrast, the scripting language-based framework 102 is integrated with the distributed data store 108 on the cloud platform 110. Moreover, the scripting language-based framework 102 includes the set of controls 112 that can be managed as a function of the scripting language code included in the application 116. Further, the controls 112 can be pre-programmed within the scripting language-based framework 102 to access the cloud-based backend system (e.g., the distributed data store 108 on the cloud platform 110). Thus, instead of the web programmer having to perform a range of backend programming as well as user interface development, the web programmer can write scripting language code and/or markup language code to manage the controls 112 of the scripting language-based framework 102, which are integrated into the rich backend of the distributed data store 108 on the cloud platform 110.

Figure 2:
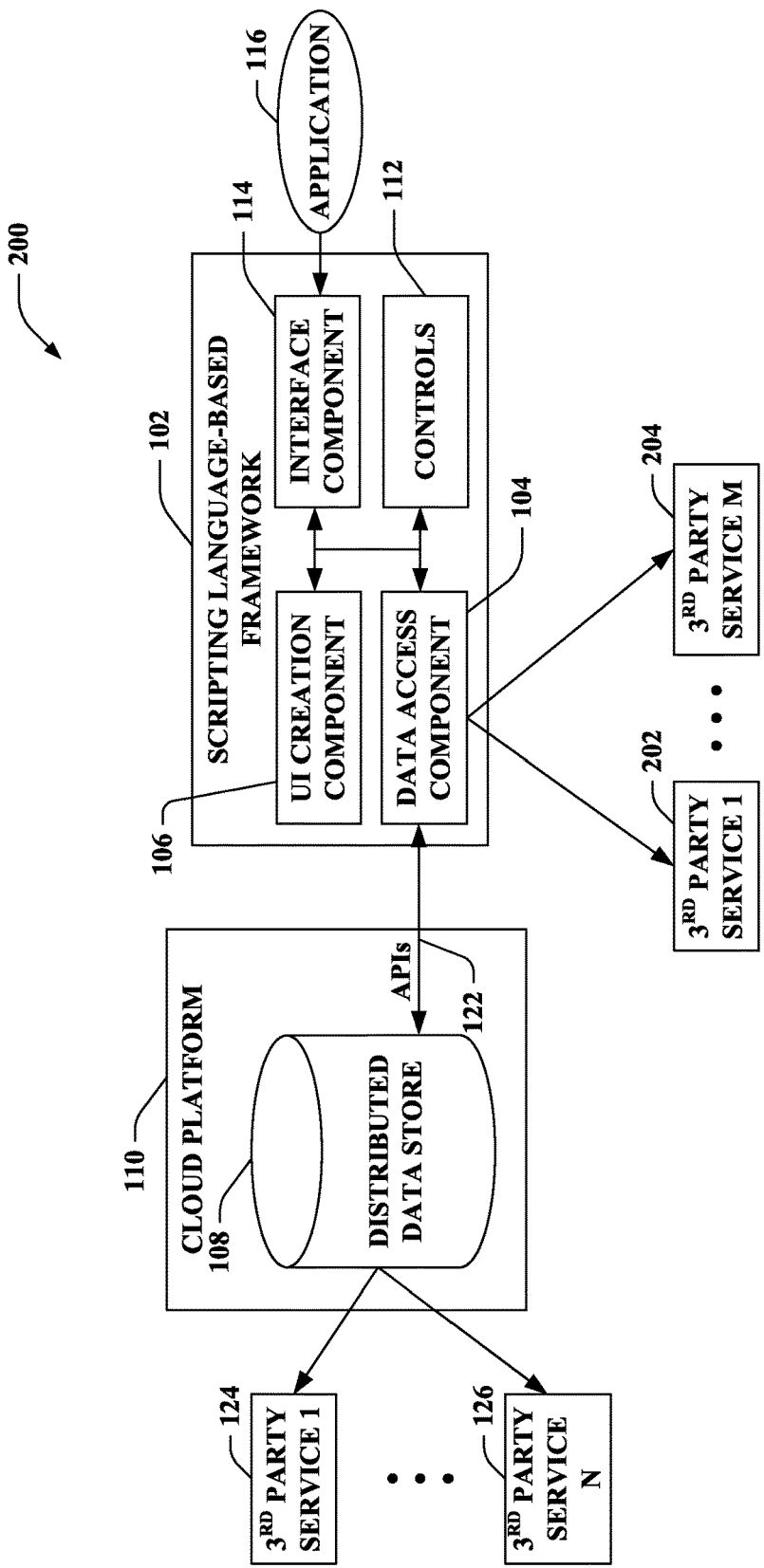
FIG. 2 illustrates a functional block diagram of an exemplary system that facilitates developing web applications that employ third party services.

Now referring to FIG. 2, illustrated is a system 200 that facilitates developing web applications that employ third party services. The system 200 includes the scripting language-based framework 102, which can further comprise the data access component 104, the UI creation component 106, the set of controls 112, and the interface component 114. As described above, the data access component 104 can directly access the distributed data store 108 on the cloud platform 110 via the APIs 122.

Moreover, one or more third party services can be directly integrated into the scripting language-based framework 102. Thus, APIs of a third party service 1 202, . . . , and a third party service M 204 (collectively referred to herein as third party services 202-204) can be exposed to the data access component 104 of the scripting language-based framework 102, where M can be substantially any integer. The scripting language-based framework 102 can abstract the APIs of the third party services 202-204. Accordingly, the application 116 can include scripting language code that manages one or more of the controls 112, where the controls 112 can cause the data access component 104 to employ one or more of the third party services 202-204 without the web programmer of the application 116 needing to have knowledge of the data structures, protocols, etc. for the APIs of the one or more third party services 202-204. Thus, the web programmer need not write code that accesses the one or more third party services 202-204 when developing the application 116 as such integration is incorporated into the scripting language-based framework 102.

Examples of the third party services 202-204 can include a web search service, an image search service, a video search service, a social networking service, a microblogging service, a mapping service, a semi-structured database search service, an authentication service, a cloud platform service, and so forth. Yet, the claimed subject matter is not limited to the foregoing examples of the third party services 202-204. According to an example, a third party service can be integrated into both the distributed data store 108 and the data access component 104 (e.g., the third party service can be one of the third party services 124-126 and one of the third party services 202-204). Additionally or alternatively, a third party service can be integrated into either the distributed data store 108 or the data access component 104 (e.g., the third party service can be one of the third party services 124-126 or one of the third party services 202-204).

By way of example, when an Internet Protocol (IP) address of a client device (e.g., a device executing the application 116) is to be provided to a third party service (e.g., to return content relevant to the IP address), a control (e.g., from the controls 112) can cause the data access component 104 to directly supply the IP address to the third party service rather than indirectly passing the IP address to the third party service. Thus, the data access component 104 can send the IP address to one or more of the third party services 202-204 directly integrated there with rather than sending the IP address to one or more of the third party services 124-126 accessible via the distributed data store 108 on the cloud platform 110.

Figure 3:
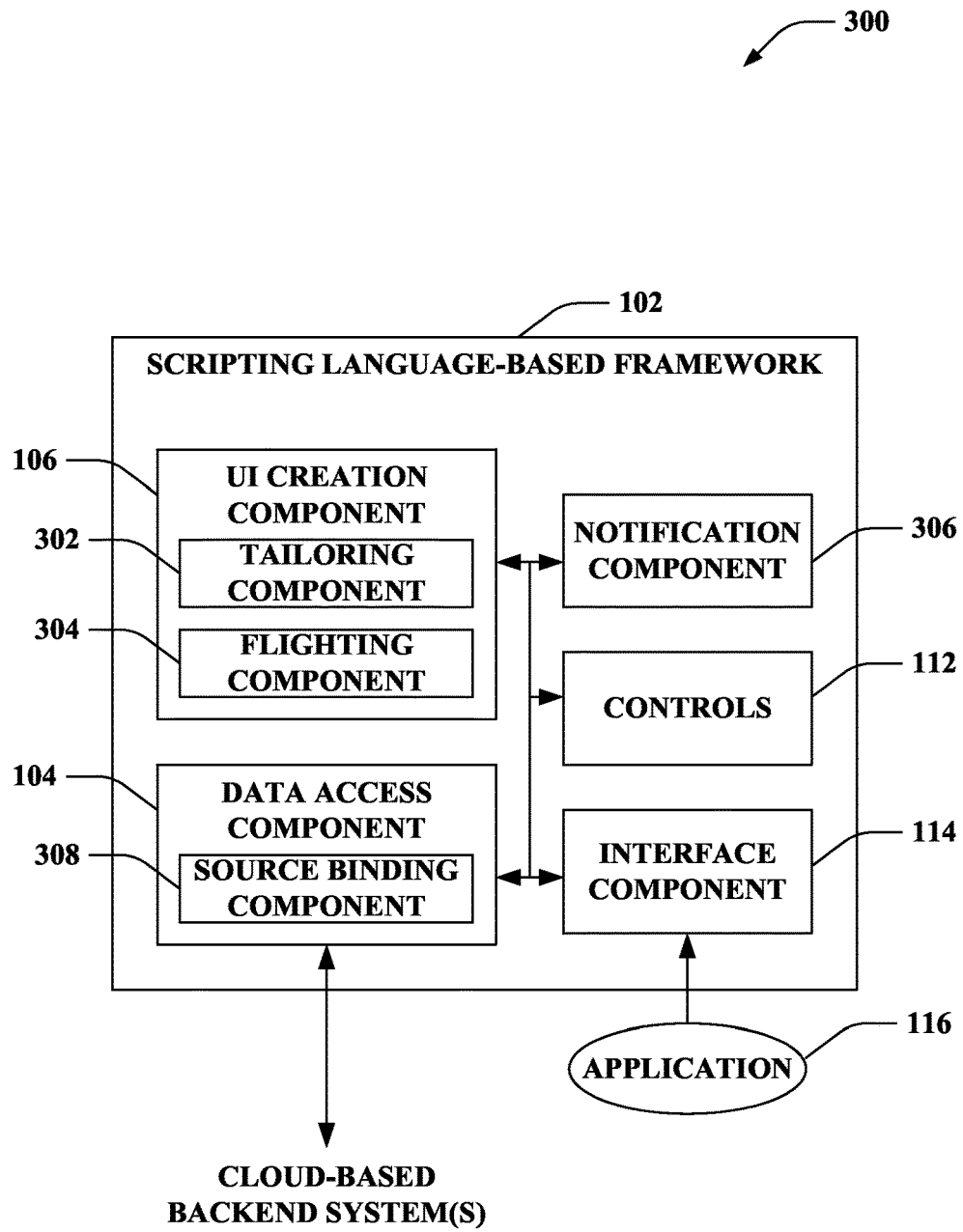
FIG. 3 illustrates a functional block diagram of an exemplary system for developing an application using a scripting language-based framework.

Now turning to FIG. 3, illustrated is a system 300 for developing the application 116 using the scripting language-based framework 102. The scripting language-based framework 102 includes the data access component 104 that can access cloud-based backend system(s) (e.g., the distributed data store 108 on the cloud platform 110 of FIG. 1, the third party services 202-204 of FIG. 2, etc.), the UI creation component 106 that generates user interfaces, and the interface component 114 that can interface with the application 116.

Moreover, the scripting language-based framework 102 includes the controls 112. The controls 112 can be based on the model-view-controller (MVC) model, for example. The controls 112 can be enabled or disabled as a function of the scripting language code included in the application 116. For instance, when one or more of the controls 112 are enabled in the application 116, the enabled control(s) 112 can cause the UI creation component 106 to generate user interface(s). Further, the controls 112 can have a range of properties and effects that can be applied to them. According to an illustration, one or more of the controls 112 can be stylized based on the scripting language code included in the application 116. For example, one or more of the controls 112 can be managed by the application 116 to cause the UI creation component 106 to animate user interface(s) rendered on a display of a client device. Possible animations can be incorporated into the controls 112 included in the scripting language-based framework 102. Pursuant to a further example, the controls 112 included in the scripting language-based framework 102 can have dependencies on each other; following this example, the dependencies between the controls 112 can allow the UI creation component 106 to provide for rich animation in generated user interface(s). By way of another example, the controls 112 may have a number of properties such as, for instance, a name, title, and so forth.

Pursuant to an example, one or more of the controls 112 can manage authentication for the application 116. For example, the application 116 can include scripting language code that chooses an authentication scheme from a set of available authentication schemes (e.g., provided by different third party services). Thereafter, the selected authentication scheme can be employed across the system from the backend (e.g., the distributed data store 108 on the cloud platform 110 of FIG. 1) to through the frontend.

Further, the UI creation component 106 can include a tailoring component 302 that can detect capabilities of client device on which the application 116 is running and modify user interfaces generated based on one or more of the controls 112 as a function of the detected capabilities. For example, if the application 116 is loaded on a smartphone, the tailoring component 302 can detect that the client device includes a camera and a microphone. Following this example, the tailoring component 302 can modify the user interfaces generated by the UI creation component 106 based on the one or more of the controls 112 to include features related to the camera and microphone of the smartphone, whereas such features can be omitted in the user interfaces generated by the UI creation component 106 when the tailoring component 302 detects that a client device lacks a camera and a microphone. By including the tailoring component 302, the scripting language-based framework 102 can enable the application 116 to employ capabilities of a client device on which the application 116 is executing. Moreover, the application 116 can work across mobile devices, desktops, laptops, etc. by utilizing the tailoring component 302 incorporated in the scripting language-based framework 102 without coding by the web programmer to support the various types of devices.

The UI creation component 106 can further include a flighting component 304 that can rollout features of the application 116 in phases. For instance, a web programmer can desire that a certain subset of users have access to a feature of the application 116. Thus, the flighting component 304 can provide the feature of the application 116 in user interface(s) generated for the subset of users while hiding the feature in user interface(s) generated for the remainder of the users of the application 116. By including the flighting component 304 in the scripting language-based framework 102, custom code to enable staggered rollout of features of the application 116 need not be written by a web programmer.

Moreover, the scripting language-based framework 102 can include a notification component 306 that receives notifications from and sends notifications to the controls 112. Thus, in the scripting language-based framework 102, the notification component 306 can exchange information between the controls 112, which can allow for having dependencies between the controls 112. According to an illustration, the application 116 can be a scripting language shell, which can include scripting language code that generates calls to a plurality of the controls 112. Following this illustration, the plurality of the controls 112 called within the application 116 can receive shell-wide notifications from the notification component 306, thereby facilitating interaction between the plurality of controls 112.

For example, two controls (e.g., from the controls 112) can be included on a webpage; one control can be a list view of names and the other control can be a detailed view, for instance. Following this example, the two controls can exchange information via the notification component 306. Thus, for instance, if a name is selected (e.g., clicked on) in the list view, then the detailed view can show details corresponding to the name selected in the list view. Moreover, the notification component 306 can exchange information used by the controls 112 to effectuate event chaining Accordingly, behaviors of the controls 112 can be chained based on events (e.g., loading data, processing a transaction, completion of an animation, received user input, etc.).

Further, the data access component 104 can include a source binding component 308 that can bind controls 112 to data sources (e.g., cloud-based backend system(s)). According to an example, the source binding component 308 can bind two of the controls 112 to objects from different sources. Pursuant to this example, the source binding component 308 can bind one of the controls 112 to objects from a first social networking service, and the other one of the controls 112 to objects from a second social network service; yet, it is to be appreciated that the claimed subject matter is not limited to the foregoing example. Since the source binding component 308 can bind controls 112 to different data sources, the data access component 104 can employ a normalized schema for information from the various data sources. Such normalization of the schema can allow for flexible exchange of information between the controls 112. In various embodiments, the source binding component 308 can bind one or more of the controls 112 to an open data protocol (ODdata) source; however, it is to be appreciated that the claimed subject matter is not so limited.

Figure 4:
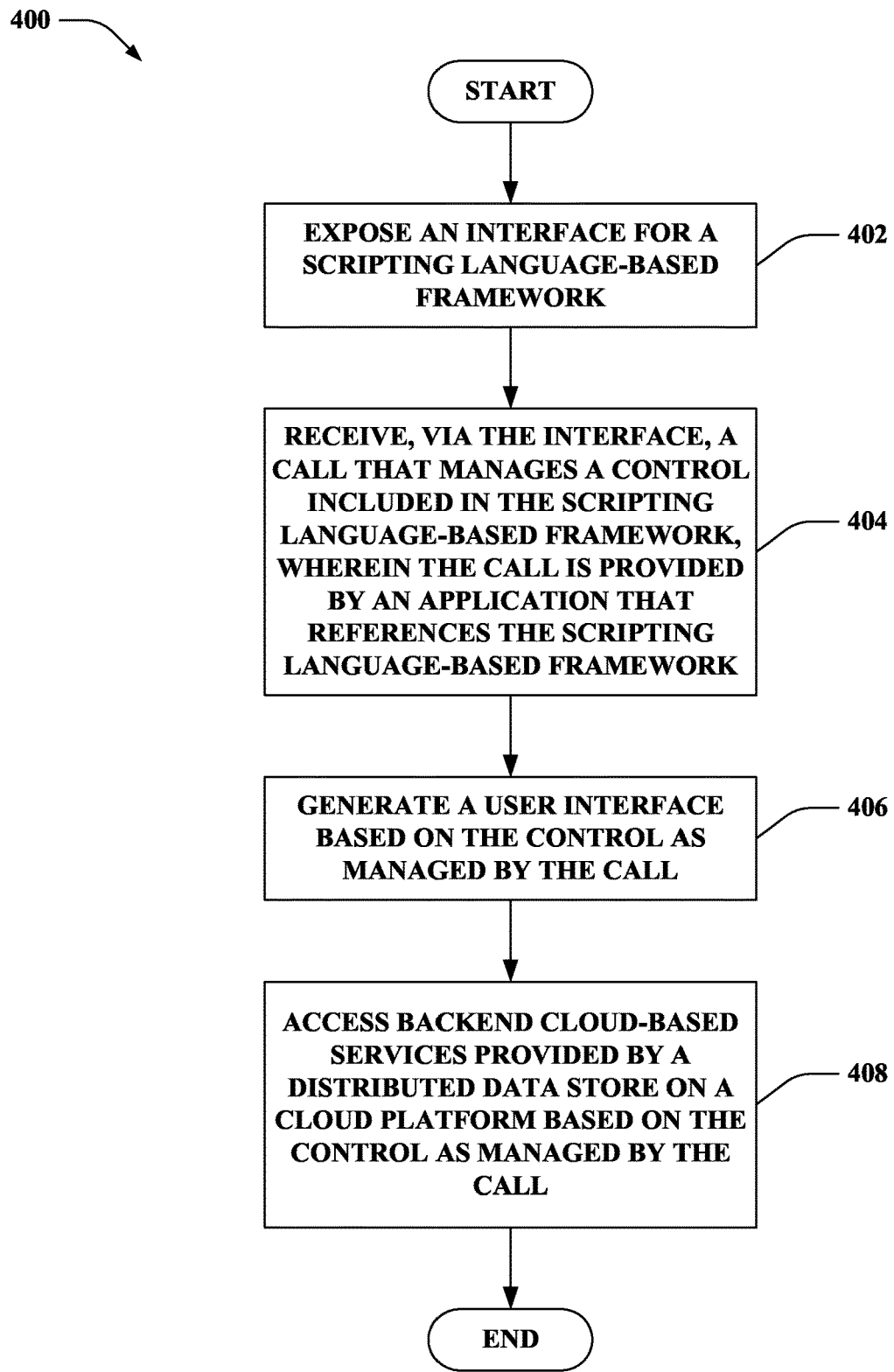
FIG. 4 is a flow diagram that illustrates an exemplary methodology for developing a web application.
Figure 5:
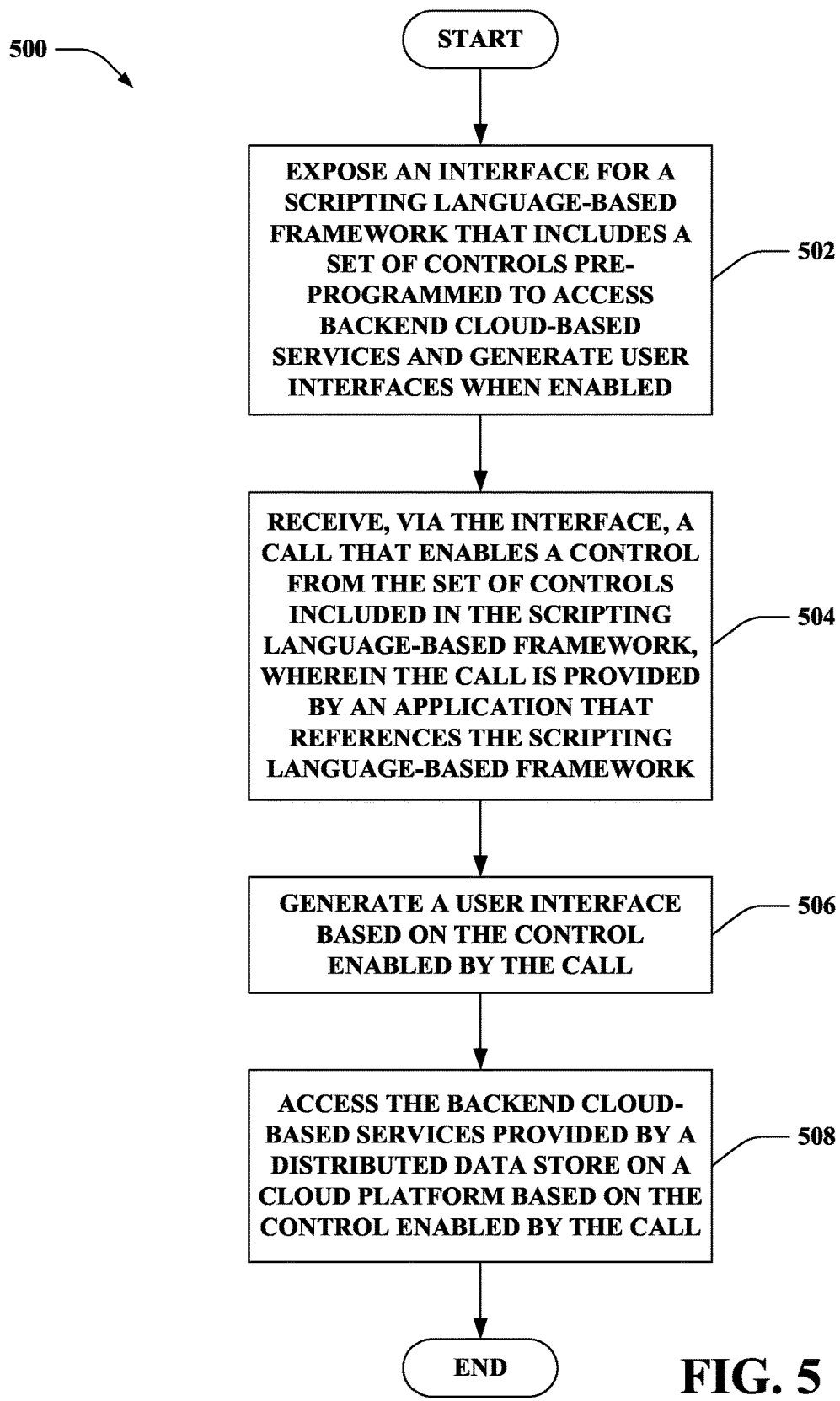
FIG. 5 is a flow diagram that illustrates another exemplary methodology for developing a web application.

FIGS. 4-5 illustrate exemplary methodologies relating to developing web applications using a scripting language-based framework. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 4 illustrates a methodology 400 for developing a web application. At 402, an interface for a scripting language-based framework can be exposed. At 404, a call can be received via the interface. The call received via the interface can manage a control included in the scripting language-based framework. Further, the call can be provided by an application that references the scripting language-based framework. For example, the call can enable the control, disable the control, set a property or effect of the control, and so forth. At 406, a user interface can be generated based on the control as managed by the call. At 408, backend cloud-based services provided by a distributed data store on a cloud platform can be accessed based on the control as managed by the call.

Now turning to FIG. 5, illustrated is a methodology 500 for developing a web application. At 502, an interface for a scripting language-based framework that includes a set of controls pre-programmed to access backend cloud-based services and generate user interfaces when enabled can be exposed. At 504, a call that enables a control from the set of controls included in the scripting language-based framework can be received via the interface. The call can be provided by an application that references the scripting language-based framework. At 506, a user interface can be generated based on the control enabled by the call. At 508, the backend cloud-based services provided by a distributed data store on a cloud platform can be accessed based on the control enabled by the call.

Figure 6:
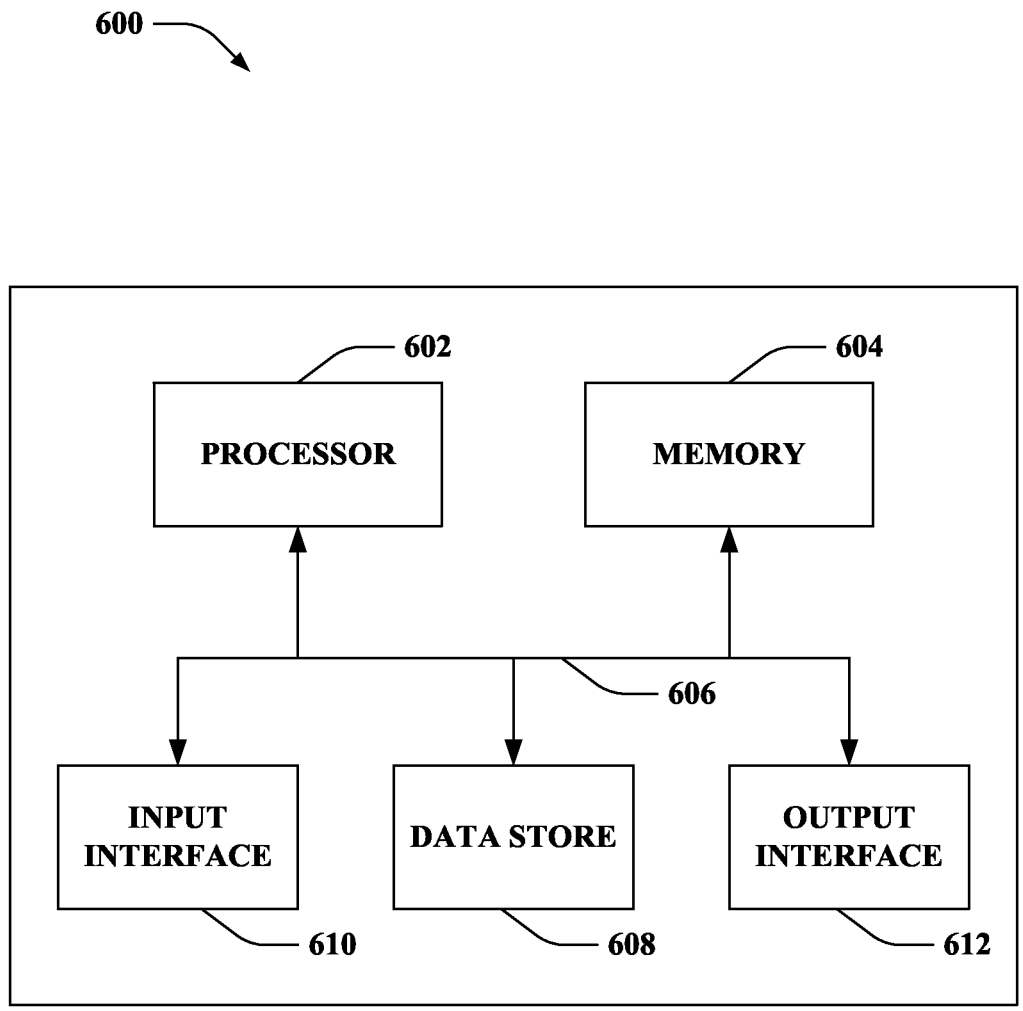
FIG. 6 illustrates an exemplary computing device.

Referring now to FIG. 6, a high-level illustration of an exemplary computing device 600 that can be used in accordance with the systems and methodologies disclosed herein is illustrated. For instance, the computing device 600 may be used in a system that develops a web application using a scripting language-based framework. By way of another example, the computing device 600 may be used in a system that executes a web application built upon a scripting language-based framework. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store an application, a scripting language-based framework, and so forth.

The computing device 600 additionally includes a data store 608 that is accessible by the processor 602 by way of the system bus 606. The data store 608 may include executable instructions, an application, a scripting language-based framework, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   exposing a control as part of a scripting language-based framework;
   receiving one or more calls to the control;
   managing generation of a user interface in response to the one or more calls to the control such that the user interface is tailored based on detected hardware capabilities of a client device on which the user interface is to be displayed; and
   managing access to a cloud-based service on a cloud platform in response to the one or more calls to the control, wherein the control is pre-programmed to access the cloud-based service on the cloud platform and generate the user interface when enabled, and wherein the one or more calls to the control enables the control.

2. The method of claim 1, wherein the cloud-based service is provided by a distributed data platform.

3. The method of claim 1, wherein the scripting language-based framework is configured to detect the hardware capabilities of the client device.

4. The method of claim 1, wherein managing the generation of the user interface in response to the one or more calls to the control further comprises:
   managing a property or an effect of the user interface in response to the one or more calls to the control.

5. The method of claim 1, wherein managing the generation of the user interface in response to the one or more calls to the control further comprises:
   managing an animation in response to the one or more calls to the control.

6. The method of claim 1, wherein the one or more calls to the control manages a user interface feature that is hidden to a first user and visible to a second user.

7. The method of claim 1, further comprising:
   exposing a second control as part of the scripting language-based framework;
   receiving one or more calls to the second control; and
   at least one of:
      managing generation of a second user interface in response to the one or more calls to the second control; or
      managing access to a second cloud-based service on the cloud platform in response to the one or more calls to the second control.

8. The method of claim 7, further comprising:
   exchanging event information between the control and the second control; and
   chaining behaviors managed by the control and the second control based on the event information.

9. The method of claim 7, wherein the second control has a dependency on the control.

10. The method of claim 1, wherein the cloud-based service is at least one of a web search service, an image search service, a video search service, a social networking service, a microblogging service, a mapping service, or a semi-structured database search service.

11. The method of claim 1, wherein the user interface is tailored such that a user interface feature is selectively hidden or visible.

12. The method of claim 1, wherein the control manages authentication to the cloud-based service utilizing an authentication scheme selected in response to the one or more calls to the control.

13. An apparatus, comprising:
   at least one processor; and
   memory coupled to the at least one processor, the memory storing instructions configured to implement a scripting language-based framework, the scripting language-based framework comprising:
      a control exposed as part of the scripting language-based framework, wherein the control receives one or more calls;
      the control manages generation of a user interface in response to the one or more calls such that the user interface is tailored based on detected hardware capabilities of a client device on which the user interface is to be displayed, wherein the scripting language-based framework is configured to detect the hardware capabilities of the client device; and the control accesses a cloud-based service on a cloud platform in response to the one or more calls, wherein the scripting language-based framework is pre-programmed such that the control of the scripting language-based framework is configured to access the cloud-based service on the cloud platform when enabled, and wherein the one or more calls to the control enables the control.

14. The apparatus of claim 13, wherein the scripting language-based framework is further pre-programmed such that the control is configured to generate the user interface when enabled.

15. The apparatus of claim 13, wherein the cloud-based service is at least one of a web search service, an image search service, a video search service, a social networking service, a microblogging service, a mapping service, or a semi-structured database search service.

16. The apparatus of claim 13, wherein the control manages a property or an effect of the user interface in response to the one or more calls.

17. The apparatus of claim 13, wherein, responsive to the one or more calls, the control manages a user interface feature of the user interface that is hidden to a first user and visible to a second user.

18. The apparatus of claim 13, wherein the control manages authentication to the cloud-based service utilizing an authentication scheme selected in response to the one or more calls to the control.

19. A computer-readable storage medium including computer-executable instructions that, when executed by at least one processor, cause the at least one processor to perform acts including:
exposing a control as part of a scripting language-based framework;
receiving one or more calls to the control;
managing generation of a user interface in response to the one or more calls to the control such that the user interface is tailored based on detected hardware capabilities of a client device on which the user interface is to be displayed; and
managing access to a cloud-based service on a cloud platform in response to the one or more calls to the control, wherein the control is pre-programmed to access the cloud-based service on the cloud platform and generate the user interface when enabled, and wherein the one or more calls to the control enables the control.

20. The computer-readable storage medium of claim 19, wherein the computer-executable instructions, when executed by the at least one processor, further cause the at least one processor to perform acts including:
managing access to a second cloud-based service on the cloud platform in response to the one or more calls to the control; and
managing generation of a second user interface in response to the one or more calls to the control.

* * * * *